United States Patent [19]

Gay

[11] Patent Number: 5,021,164

[45] Date of Patent: Jun. 4, 1991

[54] OXIDIZED ACTIVATED CARBON AND ITS USE IN REMOVAL OF AROMATIC COMPOUNDS FROM AQUEOUS SOLUTIONS

[75] Inventor: Walter A. Gay, Cheshire, Conn.

[73] Assignee: Olin Corporation, Cheshire, Conn.

[21] Appl. No.: 290,330

[22] Filed: Dec. 27, 1988

[51] Int. Cl.$^5$ .................. B01D 15/04; B01J 20/02
[52] U.S. Cl. .................. 210/694; 208/310 R; 585/826; 585/827; 585/828; 502/416; 502/423; 502/426
[58] Field of Search .............. 208/310 R; 585/826, 585/827, 828; 210/694; 502/416, 423, 426

[56] References Cited

U.S. PATENT DOCUMENTS

| 4,116,820 | 9/1978 | Blytas | 208/251 R |
| 4,517,094 | 5/1985 | Beall | 210/694 X |
| 4,547,619 | 10/1985 | Diaz | 585/826 X |
| 4,786,418 | 11/1988 | Garg et al. | 210/673 |

OTHER PUBLICATIONS

Wolff, W. F., "A Model of Active Carbon", *Journal of Physical Chemistry*, vol. 63, pp. 653-659, May, 1959.
Coughlin, R. W., and F. S. Ezra, "Role of Surface Acidity in the Adsorption of Organic Pollutants on the Surface of Carbon", *Environmental Science and Technology*, vol. 2, No. 4, pp. 291-297, Apr., 1968.
Mahajan, O. P., C. Moreno-Castilla, and P. L. Walker, Jr., "Surface-Treated Activated Carbon for Removal of Phenol From Water", Pennsylvania State University, PB80-211139, Jun., 1980.

*Primary Examiner*—Curtis R. Davis
*Attorney, Agent, or Firm*—James B. Haglind; Paul Weinstein

[57] ABSTRACT

Aromatic hydrocarbons are readily recovered from aqueous solutions by contacting the aqueous solution with an oxidized activated carbon having a low concentration of acidic oxides.

The novel oxidized activated carbon is produced by contacting activated carbon with an acidic oxidizing agent which is used in low concentrations.

The process can be employed to reduce aromatic hydrocarbons such as benzene from aqueous solutions such as industrial effluents or potable water supplies to levels permissible by environmental protection regulations.

30 Claims, No Drawings

OXIDIZED ACTIVATED CARBON AND ITS USE IN REMOVAL OF AROMATIC COMPOUNDS FROM AQUEOUS SOLUTIONS

This invention relates to the removal of organic pollutants from aqueous solutions. More particularly, this invention relates to the removal of aromatic compounds from aqueous solutions by oxidized active carbon.

Activated carbon has been produced from a wide variety of carbonaceous material, but is most frequently derived from coal, coke, or coconut shells. The typical activated carbon manufacturing process involves two main steps: (1) carbonization—heating to about 500° C. in the absence of air; (2) activation—heating to about 900° C. in the presence of gases such as steam, carbon dioxide, or air. The activated carbon so produced has a high surface area (up to 1500 m$^2$/g) with a pore volume distribution composed of micro pores (less than 20 Å), transitional pores (20–500 Å) and macro pores (greater than 500 Å). The micro pores generally account for the majority of the surface area where the adsorption of organic compounds occurs.

The activated carbon structure has been shown by W. F. Wolff (J. Physical Chem., 63, 653, 1959) to consist of rigid clusters of microcrystallites composed of fused hexagonal rings arranged in graphitic layers. Within each layer, each carbon is believed to be joined to three other carbons by sigma bonds with the fourth electron of carbon participating in a pi bond. In addition to the basal planes, the microcrystallites also have edges oxygenated by chemisorbed oxygen that can significantly influence the ultimate adsorption of organic compounds. The oxides on these edges are generally classified as either acidic or basic. The acidic oxides have been characterized as ketones, quinones, carboxylic acids, anhydrides, lactones and cyclic peroxides. The basic oxides have been postulated to be of the chromene structure. Of the two oxide types, it is generally believed that the acidic oxides play a more important role in the adsorption process.

Activated carbon, as described earlier, has been oxidized by treatment with various acidic or basic oxidizing agents. These treatments produced high degrees of oxidation and high concentrations of acidic oxides which resulted in reduced adsorption of aromatic compounds such as phenols (R. W. Coughlin et al, Envir. Sci. and Technol. 2, 291, 1968).

Now it has been found that the adsorption of aromatic compounds by oxidized activated carbon can be significantly improved in a process for removing aromatic hydrocarbon compounds from an aqueous solution which comprises contacting the aqueous solution with an oxidized activated carbon having a low concentration of acidic oxides per unit of carbon.

Any commercially available activated carbon can be employed in the novel process of the present invention.

The activated carbon particles are oxidized in the process of the present invention using any suitable oxidizing agent. Suitable oxidizing agents include oxygen-containing compounds such as oxygen (including, singlet oxygen), hydrogen peroxide, ozone, permanganate, nitric acid, and persulfate; and halogen-containing compounds such as halogen, e.g., chlorine, bromine; halogen oxides; hypohalites of alkali metals or alkaline earth metals; halites of alkali metals or alkaline earth metals; halates of alkali metals or alkaline earth metals, etc. Preferred as oxidizing agents are oxygen-containing materials with hydrogen peroxide and nitric acid being more preferred.

The activated carbon is contacted with low concentrations of the oxidizing agent which can be present in the vapor or liquid phase to produce oxidized activated carbon.

In a preferred embodiment, the activated carbon particles are slurried in an inert liquid such as water and contacted with a solution of the oxidizing agent.

The novel process of the present invention treats the activated carbon with low concentrations of an acidic oxidizing agent which results in improved adsorption properties. Suitable low level concentrations of the acidic oxidizing agent include those of generally less than about 1,000 milligrams of oxidant per gram of carbon, for example, those in the range of from about 0.5 milligram to about 800 milligrams, and preferably, from about 1 milligram to about 500 milligrams, and more preferably, from about 1.5 milligrams to about 50 milligrams per gram of activated carbon.

The novel oxidized activated carbon produced has surprisingly been found to provide significant improvements in adsorbing aromatic hydrocarbons from aqueous effluents.

While not wishing to be bound by any theory, it is believed that the oxidized activated carbon having a low concentration of acidic oxides has significant or higher concentrations of acidic oxide groups in the lower oxidation states, for example, alcohol and ketone groups, and reduced or lower concentrations of acidic oxide groups in the higher oxidation states such as carboxyl, anhydride, and lactone groups.

Aromatic hydrocarbons which may be removed from aqueous solutions include benzene, naphthalene, pyrene, anthracene, acenaphthylene, phenanthrene, chrysene, fluoranthene, fluorene, benzopyrene, benzoanthracene, benzofluoranthene, indenopyrene, dibenzoanthracene, benzoparylene and the like. In addition to the parent hydrocarbons, substituted aromatic hydrocarbons having as ring substituents halogen atoms, such as chlorine or bromine, alkyl groups having from 1 to about 12 carbon atoms, and nitro groups may be removed from aqueous solutions. Suitable examples of ring-substituted aromatic compounds include halogenated benzenes such as chlorobenzene, bromobenzene, 1,2-dichlorobenzene, 1,3-dibromobenzene, 1,4-dichlorobenzene, 1,2,4-trichlorobenzene, hexachlorobenzene, 2-chloronaphthalene, 2-bromonaphthalene, and 3,3'-dichlorobenzidine among others.

Aromatic hydrocarbons having ring-substituted alkyl groups include toluene, ethylbenzene, o-xylene, m-xylene, p-xylene, diphenylmethane, dodecylbenzene, mesitylene, durine, hexamethylbenzene, and the like.

Examples of aromatic hydrocarbons having ring-substituted nitro groups include nitrobenzene; 2,4-dinitrotoluene; and 2,6-dinitrotoluene.

Aqueous solutions containing the aromatic hydrocarbons described above which can be treated by the novel process of the present invention include industrial effluents, potable water supplies and the like.

The aqueous solution is purified by contact with the oxidized activated carbon which is believed to adsorb the aromatic hydrocarbon impurities. The novel process of the present invention may be carried out by passing the aqueous effluent through a reaction zone in which the oxidized activated carbon particles are retained during the contact period. Where the aqueous effluent is held in a treatment pond, the oxidized activated carbon particles may be added ("broadcast") onto the surface of the pond, preferably at reduced sizes such as those of powders.

The invention is illustrated by the following examples with no intention of being limited thereby. All parts and percentages are by weight unless otherwise indicated.

EXAMPLE 1

Activated carbon particles (PCB® coconut shell carbon, Calgon Corporation, Pittsburgh, Pa.) were ground, sieved to a 40×60 mesh, washed with organic-free, deionized water (0.5 L/g carbon) to remove fines, and dried to a constant weight by heating for 16 hours at 110° C.

Dried activated carbon particles (2 g) were added to a container holding 98 g of a solution of nitric acid having a concentration of 0.03 percent by weight of nitric acid. The slurry of carbon particles in the nitric acid, at ambient temperature, was stirred for 24 hours. Oxidized activated carbon particles having been treated with an oxidant at a concentration of 15 mg/g of carbon were recovered, rinsed with organic-free, deionized water (0.5 L/g carbon), dried at 110° C. for 16 hours, and re-sieved to a 40×60-mesh size.

To a glass column (1.4 cm i.d.) 8 ml of the oxidized activated carbon particles were added and packed to a constant level. Organic-free deionized water was added to wet the particles. An aqueous solution containing 500 ppb of benzene was continuously added to the column at a flow rate of 100 mls per minute (12.5 bed volumes/minute). Samples of the effluent were taken periodically and analyzed using a high-resolution gas chromatographic method with a flame ionization detector. A breakthrough above 5 ppb benzene indicated that the oxidized activated carbon particles were unacceptable for treating potable water. The results are given in Table I below.

EXAMPLE 2

The process of Example 1 was repeated identically with the sole exception that the concentration of nitric acid in the solution was 0.003 percent by weight of $HNO_3$ and the oxidized activated carbon particles had been treated with oxidant concentrations of 1.5 mg per gram of carbon. The results are given in Table I below.

EXAMPLE 3

The process of Example 1 was repeated exactly with the sole exception that hydrogen peroxide was used as the oxidant and the carbon treated at an oxidant concentration of 15 mg per gram of carbon. Table I below includes the results.

EXAMPLE 4

The process of Example 3 was followed exactly to remove benzene from the aqueous effluent whose pH was adjusted to 3 by the addition of sulfuric acid. The results are given in Table I below.

EXAMPLE 5

The process of Example 3 was followed exactly to adsorb benzene from the aqueous effluent whose pH was adjusted to 10 by the addition of sodium hydroxide. The results are given in Table I below.

EXAMPLE 6

The process of Example 2 was repeated with the exception that an aqueous solution of 0.003 percent hydrogen peroxide was employed to treat the activated carbon at an oxidant concentration of 1.5 mg per gram of carbon. The results are given in Table I below.

Comparative Examples A, B, and C

Activated carbon (PCB® coconut shell) which had not been oxidized was substituted in the processes of Examples 4, 5, and 6. The results are given in Table I below.

Comparative Example D

The process of Example 1 was repeated exactly with the sole difference being that the activated carbon was treated with nitric acid at a concentration of 1500 mg per g of carbon. Table I below shows the results of this high level oxidation.

Comparative Examples E, F, and G

The processes of Examples 4, 5, and 6 respectively were duplicated to treat activated carbon with a hydrogen peroxide solution at a concentration of 1500 mg per g of carbon. The results are given in Table I below.

TABLE I

Benzene Removal From Aqueous Effluent
(Initial $C_6H_6$ Concentration: 500 ppb)

| Example No. | Oxidant | Concentration (mg/g C) | Effluent $C_6H_6$ Concentration (ppb) After Bed Volume (000) | | | | | | | | | |
|---|---|---|---|---|---|---|---|---|---|---|---|---|
| | | | 1.1 | 2.3 | 3.4 | 4.5 | 5.6 | 6.8 | 7.9 | 9.0 | 10.1 | 11.3 |
| 1 | $HNO_3$ | 15 | 0 | 0 | 0 | 0 | 0 | 0 | 0 | 2 | 2 | 4 |
| 2 | $HNO_3$ | 1.5 | 0 | 0 | 0 | 0 | 1 | 2 | 2 | 4 | 6 | 8 |
| 3 | $H_2O_2$ (pH 7) | 15 | 0 | 0 | 0 | 1 | 1 | 1 | 2 | 4 | 5 | 10 |
| 4 | $H_2O_2$ (pH 3) | 15 | 0 | 0 | 0 | 1 | 1 | 1 | 1 | 3 | 5 | 9 |
| 5 | $H_2O_2$ (pH 10) | 15 | 0 | 0 | 0 | 1 | 1 | 1 | 2 | 5 | 5 | 12 |
| 6 | $H_2O_2$ (pH 7) | 1.5 | 0 | 0 | 1 | 0 | 1 | 2 | 2 | 2 | 6 | 8 |
| Comp. A | None (pH 7) | | 0 | 0 | 0 | 1 | 2 | 1 | 5 | 7 | 12 | 12 |
| Comp. B | None (pH 3) | | 1 | 0 | 1 | 1 | 3 | 4 | 7 | 8 | 14 | 17 |
| Comp. C | None (pH 10) | | 0 | 0 | 1 | 1 | 3 | 2 | 5 | 11 | 12 | 12 |
| Comp. D | $HNO_3$ | 1500 | 0 | 0 | 0 | 0 | — | 3 | 4 | 6 | 10 | 15 |
| Comp. E | $H_2O_2$ (pH 7) | 1500 | 0 | 1 | 1 | 3 | 4 | 4 | 11 | 13 | 18 | 25 |
| Comp. F | $H_2O_2$ | 1500 | 1 | 2 | 2 | 5 | 10 | 10 | 13 | 19 | 25 | 32 |

TABLE I-continued

Benzene Removal From Aqueous Effluent
(Initial $C_6H_6$ Concentration: 500 ppb)

| Example No. | Oxidant | Concentration (mg/g C) | Effluent $C_6H_6$ Concentration (ppb) After Bed Volume (000) | | | | | | | | |
|---|---|---|---|---|---|---|---|---|---|---|---|
| | | | 1.1 | 2.3 | 3.4 | 4.5 | 5.6 | 6.8 | 7.9 | 9.0 | 10.1 | 11.3 |
| Comp. G | $H_2O_2$ (pH 3) (pH 10) | 1500 | 1 | 1 | 2 | 3 | 4 | 5 | 10 | 16 | 19 | 27 |

As shown in Table I, the oxidized carbon particles of Examples 1-6 of the present invention indicated a breakthrough at about 10,000 bed volume, corresponding to a 25 percent adsorption enhancement over untreated activated carbon particles (Comparative Examples A, B, and C) or oxidized carbon particles treated with high levels of oxidant (Comparative Examples D, E, F, and G). Where hydrogen peroxide was the oxidant, this improvement in benzene removal was maintained for neutral, acidic, or basic aqueous solutions.

EXAMPLE 7

Oxidized activated carbon was produced by the process of Example 1 using a nitric acid solution containing 0.03 percent by weight of $HNO_3$. Oxidized activated carbon (8 mls) treated with an oxidant concentration of 15 mg per g of carbon was added to the column. An aqueous solution containing 50 parts per million (ppm) of benzene was continuously passed through the column. Periodically samples were taken of the effluent from the column and the benzene concentration determined. A breakthrough was indicated when the effluent contained 57 ppb or greater of benzene. The results are given in Table II below.

EXAMPLE 8

The process of Example 7 was repeated using as the oxidant an aqueous solution of hydrogen peroxide having a concentration of 0.03 percent by weight of $H_2O_2$.

EXAMPLE 9

The process of Example 7 was repeated using a nitric acid solution containing 0.003 percent by weight of $HNO_3$. The results are given in Table II below.

EXAMPLE 10

The process of Example 8 was repeated using a hydrogen peroxide solution containing 0.003 percent by weight of $H_2O_2$. Table II contains the results of the treatment.

Comparative Example H

The process of Example 7 was repeated using activated carbon which had not been treated with an oxidant. The results are given in Table II below.

TABLE II

Benzene Removal From Aqueous Effluent
(Initial $C_6H_6$ Concentration: 50 ppm)

| Example No. | Oxidant | Concentration (mg/g C) | Effluent Concentration (ppb) After Bed Volume | | | | | |
|---|---|---|---|---|---|---|---|---|
| | | | 1.25 | 2.50 | 3.75 | 5.00 | 6.25 | 7.50 |
| 7 | $HNO_3$ | 15 | 10 | 21 | 42 | 78 | 130 | 224 |
| 8 | $H_2O_2$ (pH 7) | 15 | 25 | 45 | 78 | 122 | 206 | 348 |
| 9 | $HNO_3$ | 1.5 | 12 | 20 | 38 | 77 | 113 | 190 |
| 10 | $H_2O_2$ (pH 7) | 1.5 | 5 | 21 | 36 | 62 | 80 | 132 |
| Comp. H | None | | 32 | 44 | 71 | 111 | 176 | 240 |

Benzene removal from aqueous solutions containing industrial concentrations was significantly improved using nitric acid at 1.5 and 15 mg concentrations and $H_2O_2$ at a 1.5 mg concentration as shown by having a breakthrough point at 450 bed volumes versus about 300 bed volumes for untreated activated carbon particles.

EXAMPLE 11

The process of Example 1 was repeated exactly using F-300 active carbon (bituminous coal carbon, a product of Calgon Carbon Corporation). The results of benzene adsorption are given in Table III below.

EXAMPLE 12

The process of Example 3 was duplicated using the F-300 active carbon. Table III contains the results obtained.

Comparative Example J

The process of Example 11 was repeated using a nitric acid solution as the oxidant containing 30 percent by weight of $HNO_3$ to treat activated carbon particles at an oxidant level of 15,000 mg per g of carbon. The results are indicated in Table III.

Comparative Example K

The process of Example 12 was reproduced exactly using as the oxidant a neutral hydrogen peroxide solution containing 30 percent by weight of $H_2O_2$ to produce oxidized activated carbon particles treated with 15,000 mg of oxidant per gram of carbon. Table III includes the results obtained.

Comparative Example L

The process of Example 11 was repeated using unoxidized F-300 activated carbon particles as the control. The results are given in Table III.

TABLE III

| Example No. | Oxidant | Concentration (mg/g C) | Benzene Removal From Aqueous Effluent (Initial $C_6H_6$ Concentration: 50 ppm) Effluent $C_6H_6$ Concentration (ppm) After Bed Volume | | | | | | | | | | | |
|---|---|---|---|---|---|---|---|---|---|---|---|---|---|---|
| | | | 6.25 | 12.5 | 18.75 | 25 | 31.25 | 37.5 | 43.75 | 50 | 56.25 | 62.5 | 68.75 | 75 |
| 11 | $HNO_3$ | 15 | 0.18 | 0.29 | 0.47 | 0.49 | 0.70 | 0.84 | 1.2 | 1.6 | 2.0 | 2.7 | 3.6 | 4.6 |
| 12 | $H_2O_2$ | 15 | 0.12 | 0.18 | 0.29 | 0.43 | 0.67 | 0.98 | 1.4 | 1.7 | 2.5 | 3.1 | 3.8 | 4.7 |
| Comp. J | $HNO_3$ | 15,000 | 0.24 | 1.3 | 2.3 | 3.4 | 5.2 | 6.6 | 8.9 | 11.8 | 12.7 | — | 17.4 | 19.8 |
| Comp. K | $H_2O_2$ | 15,000 | 0.14 | 1.0 | 2.0 | 3.1 | 4.6 | 6.5 | 8.2 | 9.3 | 12.3 | 12.6 | 16.3 | 17.9 |
| Comp. L | None | | 0.16 | 0.40 | 0.63 | 0.79 | 1.3 | 1.4 | 1.9 | 2.4 | 3.4 | 3.8 | 5.6 | 7.5 |

Oxidized activated carbon having low concentrations of acidic oxides as illustrated by Examples 11 and 12, shows significant improvement in adsorbing benzene from an aqueous solution over untreated carbon (Comparative Example L) or particularly oxidized activated carbon having high concentrations of oxidant (Comparative Examples J and K).

What is claimed is:

1. A process for removing aromatic hydrocarbon compounds, selected from the group consisting of aromatic hydrocarbons and aromatic hydrocarbons having as ring substituents nitro groups, halogen atoms, and alkyl groups having from 1 to about 12 carbon atoms, from an aqueous solution which comprises contacting the aqueous solution containing the aromatic hydrocarbon compounds with an oxidized activated carbon prepared by treating activated carbon with less than about 1,000 milligrams of oxidant per gram of carbon.

2. The process of claim 1 in which the aromatic hydrocarbon is selected from the group consisting of benzene, naphthalene, pyrene, anthracene, acenaphthylene, phenanthrene, chrysene, fluoroanthene, fluorene, benzopyrene, benzoanthracene, benzofluoranthene, indenopyrene, dibenzoanthracene, and benzoparylene.

3. A process for producing oxidized activated carbon particles which comprises contacting activated carbon with an acidic oxidizing agent at a concentration of less than about 1000 milligrams per gram of carbon.

4. The process of claim 4 in which the acidic oxidizing agent is selected from the group consisting of available chlorine-containing compounds and oxygen-containing compounds.

5. The process of claim 3, in which the acidic oxidizing agent is selected from the group consisting of oxygen, ozone, hydrogen peroxide, permanganate, persulfate, and nitric acid.

6. The process of claim 5 in which the acidic oxidizing agent has a concentration of from about 0.5 to about 800 milligrams per gram of carbon.

7. The process of claim 6 in which the acidic oxidizing agent is nitric acid.

8. The process of claim 6 in which the acidic oxidizing agent is hydrogen peroxide.

9. A process for removing aromatic hydrocarbon compounds from an aqueous solution which comprises:
(a) oxidizing activated carbon particles with an acidic oxidizing agent having a concentration of less than about 1000 milligrams of acidic oxidizing agent per gram of carbon to produce oxidized activated carbon particles; and
(b) contacting the oxidized activated carbon particles with the aqueous solution to remove the aromatic hydrocarbon componds.

10. The process of claim 9 in which the acidic oxidizing agent is an oxygen-containing compound or an available chlorine-containing compound.

11. The process of claim 10 in which the aromatic hydrocarbon is selected from the group consisting of aromatic hydrocarbons and aromatic hydrocarbons having as ring-substituents, nitro groups, halogen atoms, and alkyl groups having from 1 to about 12 carbon atoms.

12. The process of claim 11 in which the aromatic hydrocarbon is selected from the group consisting of benzene, naphthalene, pyrene, anthracene, acenaphthylene, phenanthrene, chrysene, fluoroanthene, fluorene, benzopyrene, benzoanthracene, benzofluoranthene, indenopyrene, dibenzoanthracene, and benzoparylene.

13. The process of claim 10 in which the acidic oxidizing agent is selected from the group consisting of oxygen, ozone, hydrogen peroxide, permanganate, persulfate, and nitric acid.

14. The process of claim 13 in which the acidic oxidizing agent has a concentration of from about 0.5 to about 800 milligrams per gram of carbon.

15. The process of claim 14 in which the oxidizing agent is nitric acid.

16. The process of claim 14 in which the oxidizing agent is hydrogen peroxide.

17. The process of claim 14 in which the aromatic hydrocarbon is benzene.

18. A process for oxidizing activated carbon with an acidic oxidizing agent which comprises reacting the activated carbon with an acidic oxidizing agent at a concentration of less than about 1000 milligrams per gram of carbon.

19. The process of claim 18 in which the acidic oxidizing agent is selected from the group consisting of oxygen-containing compounds.

20. The process of claim 19 in which the reaction is conducted in an inert liquid medium.

21. The process of claim 20 in which the acidic oxidizing agent is nitric acid.

22. The process of claim 20 in which the oxidizing agent is hydrogen peroxide.

23. Oxidized activated carbon produced by the process of claim 3.

24. Oxidized activated carbon produced by the process of claim 6.

25. Oxidized activated carbon produced by the process of claim 7.

26. Oxidized activated carbon produced by the process of claim 8.

27. Oxidized activated carbon produced by the process of claim 18.

28. Oxidized activated carbon produced by the process of claim 19.

29. Oxidized activated carbon produced by the process of claim 21.

30. Oxidized activated carbon produced by the process of claim 22.

* * * * *